(12) United States Patent
Baek et al.

(10) Patent No.: US 7,215,253 B2
(45) Date of Patent: May 8, 2007

(54) METHOD FOR RECOGNIZING ELECTRONIC APPLIANCE IN MULTIPLE CONTROL SYSTEM

(75) Inventors: Seung Myun Baek, Changwon-shi (KR); Koon Seok Lee, Changwon-shi (KR); Hwan Jong Choi, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 10/506,075

(22) PCT Filed: Apr. 10, 2002

(86) PCT No.: PCT/KR02/00650

§ 371 (c)(1),
(2), (4) Date: Aug. 31, 2004

(87) PCT Pub. No.: WO03/085889

PCT Pub. Date: Oct. 16, 2003

(65) Prior Publication Data

US 2005/0146416 A1 Jul. 7, 2005

(51) Int. Cl.
*G06F 7/04* (2006.01)
*H04L 12/24* (2006.01)

(52) U.S. Cl. .................... 340/825.52; 340/825.22; 710/9

(58) Field of Classification Search ........... 340/825.52, 340/825.53, 825.22, 825.24, 825.25; 710/9
See application file for complete search history.

(56) References Cited

U.S. PATENT DOCUMENTS

| 4,918,598 | A | * | 4/1990 | Ashkin et al. ............ 710/3 |
| 5,530,896 | A | * | 6/1996 | Gilbert .................... 710/9 |
| 5,539,390 | A | * | 7/1996 | Nagano et al. ........ 340/825.52 |
| 5,675,571 | A | * | 10/1997 | Wilson .................. 370/475 |
| 5,875,301 | A | | 2/1999 | Duckwall et al. |
| 6,052,750 | A | | 4/2000 | Lea |
| 6,114,970 | A | | 9/2000 | Kirson et al. |
| 2003/0032410 | A1 | | 2/2003 | Saraswat |
| 2003/0236842 | A1 | | 12/2003 | Natarajan et al. |
| 2004/0077363 | A1 | | 4/2004 | Lazaro et al. |

FOREIGN PATENT DOCUMENTS

| EP | 1033890 A1 | 9/2000 |
| EP | 1094638 A2 | 4/2001 |
| EP | 1128562 A2 | 8/2001 |
| GB | 2378348 A | 2/2003 |
| KR | 2002-0011029 | 2/2002 |
| WO | WO 99/55070 | 10/1999 |

* cited by examiner

*Primary Examiner*—Edwin C. Holloway, III
(74) *Attorney, Agent, or Firm*—McKenna Long & Aldridge LLP

(57) ABSTRACT

A method for recognizing an electronic appliance in multiple control system for controlling at least one electronic appliance is disclosed, which includes the steps for setting each ID including a variable value and a fixed value to the electronic appliances, determining whether the electronic appliances of the same model exist among the connected electronic appliances on connecting the electronic appliances to the multiple control system by reading corresponding ID and analyzing the ID value; changing the ID of the connected electronic appliance in case that the electronic appliances of the same model exist; and recognizing the corresponding electronic appliance as the changed ID.

7 Claims, 1 Drawing Sheet

METHOD FOR RECOGNIZING ELECTRONIC APPLIANCE IN MULTIPLE CONTROL SYSTEM

TECHNICAL FIELD

The present invention relates to a multiple control system for controlling a plurality of electronic appliances, and more particularly, to a method for recognizing an electronic appliance in a multiple control system.

BACKGROUND ART

Generally, when controlling a plurality of electrical appliances from a central controller, a process of distinguishing each electrical appliance should be carried out from the central controller prior to the controlling process. Therefore, a method of giving a unique identity (ID) to each electrical appliance is used herein.

In the related art multiple control system, shown in FIG. 1, each electronic appliance 3 is commonly connected to a network 2 through a communication line 1.

Also, a central controller 4 sends data to and receives data from each electronic appliance 3 through the network 2.

Each electronic appliance has a predetermined unique ID based on the appliance model. Herein, the number of bits for each model ID is identical. However, the corresponding values are all decided differently. More specifically, the ID values are decided so that each electronic appliance is given a unique ID. For example, one appliance may be given an ID value of '0000H', whereas another appliance is given an ID value of '0001H'. Such ID value for each electronic appliance is pre-stored inside the central controller 4.

Therefore, when the central controller 4 gives out a certain operation command, the ID of the corresponding appliance is included in the actual command, which is transmitted through the network 2. Subsequently, each electronic appliance reads the data sent through the central controller 4. Then, the appliance having an ID value identical to that of the command executes the operation.

A plurality of electronic appliances of the same model may be connected to the multiple control system. If the ID's of at least two electronic appliances are determined to be identical, then, during a communication between the central controller 4 and the electronic appliances, the appliances having identical ID's may simultaneously respond on the network, which may eventually lead to a confusion in data.

DISCLOSURE OF THE INVENTION

Accordingly, the present invention is directed to a method for recognizing an electronic appliance in a multiple control system that substantially obviates one or more of the problems due to limitations and disadvantages of the related art.

An object of the present invention is to provide a method for recognizing an electronic appliance in a multiple control system in which a new method of giving an ID is applied, so that electronic appliances of an identical model may easily be distinguished without requiring a no separate storage of data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for recognizing an electronic appliance in a multiple control system controlling more than one electronic appliances includes determining an ID including a variable value and a static value for each electronic appliance, reading the ID when connecting the electronic appliance to the network, analyzing the ID value, and deciding whether another electronic appliance model having the same ID exists among the electronic appliances connected to the network, and changing the ID of the electronic appliance connected to the network if decided that a model having the same ID exists and identifying the corresponding electronic appliance with the newly changed ID.

To further achieve these and other advantages and in accordance with the purpose of the present invention, setting up an ID for each electronic appliance according to its model, reading the ID when connecting the electronic appliance to the network, analyzing the ID value, and deciding whether other electronic appliance models having the same ID exists among the appliance models connected to the network, and giving a virtual ID to the electronic appliance connected to the network, if decided that a model having the same ID exists, and recognizing data of a corresponding appliance model by matching with the given virtual ID.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
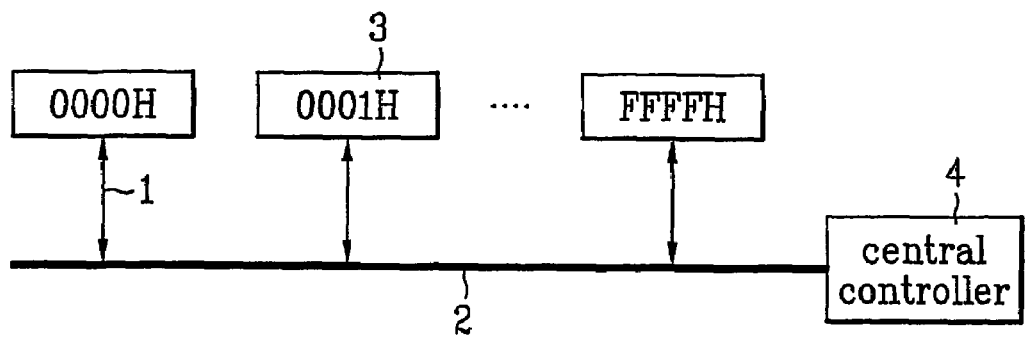
FIG. 1 is a block diagram illustrating a method for recognizing an electronic appliance in a multiple control system of the related art.
Figure 2:
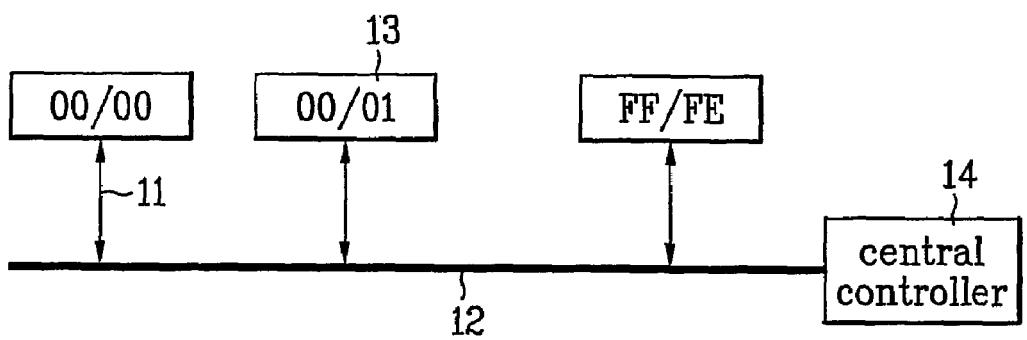
FIG. 2 is a block diagram illustrating a method for recognizing an electronic appliance according to a first embodiment of the present invention.
Figure 3:
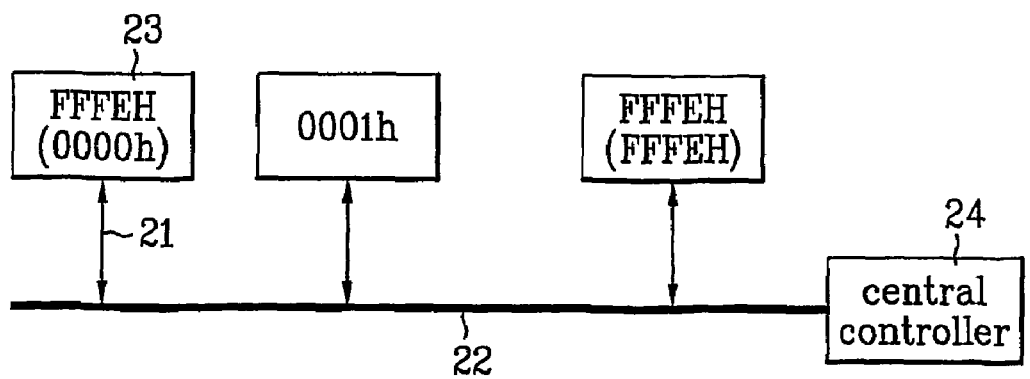
FIG. 3 is a block diagram illustrating a method for recognizing an electronic appliance according to a second embodiment of the present invention.

FIG. 2 is a block diagram illustrating a method for recognizing an electronic appliance according to a first embodiment of the present invention. FIG. 3 is a block diagram illustrating a method for recognizing an electronic appliance according to a second embodiment of the present invention.

First Embodiment

In the method for recognizing an electronic appliance according to a first embodiment of the present invention, a variable ID is used. When an electronic appliance 13 is connected to a multiple control system, the electronic appliance 13 transmits its given ID to a central controller 14.

Herein, each electronic appliance 13 is given an ID distinguished according to the type and model of the appliance. The ID includes a static ID for distinguishing the product model and a variable ID, which may be varied in a later process.

Subsequently, the central controller 14 analyzes the static ID of the ID transmitted from the electronic appliance 13.

The central controller 14 then determines whether the electronic appliance sending the ID have data that are identical to those of the other appliances currently connected to the network. If the data of the other electronic appliances are determined to be identical, then an ID change command is sent to the network.

All identical electronic appliances receive the ID change command. However, only the newly connected appliance changes its ID. When changing the ID, the static ID is left unchanged, and only the variable ID is changed. Then, an ID change flag is set.

For example, as shown in FIG. 2, when the composition of the ID of an electronic appliance is '00(static ID)00 (variable ID)', and another electronic appliance of an identical type and model is newly connected, then the variable ID of the newly connected appliance is changed to '01'. Similarly, when a newly connected electronic appliance is of an identical type and model as that of an electronic appliance initially connected to the network, then the variable ID of the newly connected appliance is changed to '10'. The ID's of the electronic appliances are distinguished by the above-described method.

Subsequently, the central controller 14 stores the changed ID into its memory. When the data is exchanged afterwards, the static ID and the variable ID are transmitted together. Therefore, the central controller 14 is able to recognize the model of the electronic appliance corresponding to the changed ID, and so a separate storage of the appliance model information is not required.

Second Embodiment

In the method for recognizing an electronic appliance in a multiple control system according to a second embodiment of the present invention, a virtual ID is used. When an electronic appliance 23 is connected to a multiple control system, the electronic appliance 23 transmits its given ID to a central controller 24.

Herein, each electronic appliance 23 is distinguished according to its type and model, and each appliance is given a static ID.

Subsequently, the central controller 24 analyzes the ID transmitted from the electronic appliance 23. The central controller 24 then determines whether the electronic appliance sending the ID have data that are identical to those of the other appliances currently connected to the network. If the data of the other electronic appliances are determined to be identical, then an ID change command is sent to the network.

All the identical electronic appliances receive the ID change command. However, only the newly connected appliance changes its ID.

As shown in FIG. 3, when changing the ID, the original ID 'FFFEH' remains unchanged, and a separate virtual ID '0000h' is newly formed. Then, an ID change flag is set. Therefore, when exchanging data in a later process, the virtual ID is transmitted instead of the original ID. Then, the virtual ID is deleted once the power is turned off.

INDUSTRIAL APPLICABILITY

The method for recognizing an electronic appliance in a multiple control system according to the present invention uses one of a variable ID and a virtual ID. Thus, electronic appliances of an identical type and model can be easily distinguished. Additionally, the accuracy in transmitting the data can be enhanced.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for recognizing an electronic appliance in a multiple control system capable of controlling more than one electronic appliance, comprising:
    setting up an ID which includes a variable value and a static value for each electronic appliance;
    transmitting the ID from an electronic appliance to a central controller;
    reading the ID when connecting the electronic appliance to a network, analyzing the ID, and deciding whether another electronic appliance, connected to the network, having the same ID exists among any other electronic appliances connected to the network; and
    changing the variable value of the ID of the electronic appliance connected to the network at the central controller, if it is decided that another electronic appliance has the same ID, and recognizing the corresponding electronic appliance with the newly changed ID, wherein the static value is based on a model number of the electronic appliance.

2. The method of claim 1, wherein analyzing the ID is carried out by comparing the static value with a predetermined static value.

3. The method of claim 1, further comprising:
    transmitting an ID change command to each electronic appliance, when changing the ID of the connected electronic appliance; and
    changing only the variable value of the ID data corresponding to the electronic appliance in which an ID change is carried out.

4. The method of claim 1, wherein changing the variable value involves incrementing the variable value.

5. The method of claim 1, wherein the electronic appliance having its ID changed sets an ID change flag.

6. A method for recognizing an electronic appliance in a multiple control system controlling more than one electronic appliance, comprising:
    setting up an ID for each electronic appliance according to its model number;
    reading the ID when connecting the electronic appliance to the network, analyzing the ID value, recognizing whether other electronic appliances connected to the network have the same ID, and recognizing data of a corresponding appliance model by matching a given virtual ID, wherein the virtual ID is deleted when the power of its corresponding electronic appliance is turned off.

7. The method of claim 6, wherein the electronic appliance given a virtual ID sets an ID change flag.

* * * * *